United States Patent
Kawasaki et al.

(10) Patent No.: US 7,511,827 B2
(45) Date of Patent: Mar. 31, 2009

(54) INTERFEROMETER AND METHOD OF CALIBRATING THE INTERFEROMETER

(75) Inventors: Kazuhiko Kawasaki, Ushiku (JP); Yoshimasa Suzuki, Tsukuba (JP); David W. Sesko, Woodinville, WA (US)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/411,809

(22) Filed: Apr. 27, 2006

(65) Prior Publication Data
US 2006/0250618 A1 Nov. 9, 2006

(30) Foreign Application Priority Data
Apr. 27, 2005 (JP) .............................. 2005-128872

(51) Int. Cl.
*G01B 11/02* (2006.01)
(52) U.S. Cl. ..................................... 356/512
(58) Field of Classification Search ................. 356/495, 356/512
See application file for complete search history.

(56) References Cited

U.S. PATENT DOCUMENTS

| | | | | |
|---|---|---|---|---|
| 5,392,116 A * | 2/1995 | Makosch | ..................... | 356/495 |
| 6,496,269 B2 * | 12/2002 | Mitsutani et al. | ............ | 356/512 |
| 7,212,290 B2 * | 5/2007 | Fine et al. | ................... | 356/495 |
| 2002/0167674 A1 * | 11/2002 | Yoshizumi et al. | .......... | 356/492 |
| 2003/0053071 A1 | 3/2003 | James et al. | | |
| 2003/0081222 A1 * | 5/2003 | Kato | .......................... | 356/495 |
| 2003/0164951 A1 | 9/2003 | Deck et al. | | |
| 2005/0030550 A1 * | 2/2005 | Nahum | ....................... | 356/521 |
| 2006/0285122 A1 * | 12/2006 | Bankhead et al. | ........... | 356/511 |

FOREIGN PATENT DOCUMENTS

| | | |
|---|---|---|
| EP | 1 411 321 A | 4/2004 |
| EP | 1 505 365 A | 2/2005 |
| JP | A 2-287107 | 11/1990 |
| JP | A 2000-329535 | 11/2000 |

* cited by examiner

*Primary Examiner*—Tarifur Chowdhury
*Assistant Examiner*—Jonathan M Hansen
(74) *Attorney, Agent, or Firm*—Oliff & Berridge, PLC (57) ABSTRACT

An interferometer comprises a wavelength-variable light source. A reference light and a measurement light are synthesized, and the synthesized light is split into a plurality of split lights. A certain phase difference is provided between the split lights through phase shifting optical members. A plurality of interference fringe images formed by the phase-shifted split lights are captured at an imaging unit. Biases, amplitudes and the amounts of phase shift of the interference fringes formed by the plurality of split lights are calculated, based on interference fringe intensities of the imaged interference fringes, which are obtained by disposing a calibrating substrate instead of the measuring object varying the wavelength of the emitted light to plural values, and operating the imaging unit to capture a plurality of images of interference fringes obtained by the split lights.

13 Claims, 8 Drawing Sheets

INTERFEROMETER AND METHOD OF CALIBRATING THE INTERFEROMETER

CROSS REFERENCE TO RELATED APPLICATION

This application is based on and claims the benefit of priority from prior Japanese Patent Application No. 2005-128872, filed on Apr. 27, 2005, the entire contents of which are incorporated herein by reference.

BACKGROUND OF THE INVENTION

1. Field of the Invention

The present invention relates to an interferometer and method of calibrating the interferometer.

2. Description of the Related Art

Methods of analyzing interference fringes obtained by an interferometer, include a phase shifting method. The phase shifting method is a method of shifting phases of interference fringes by means of, for example, displacing a reference surface in the direction of the optical axis to acquire a plurality of interference fringe images, and calculating the shape of a measuring object. This method is currently applied in many interferometers because it can achieve high accuracy.

The phase shifting method, however, requires a long period of time for measurement because it acquires interference fringes while displacing the reference surface. During the acquisition of interference fringes, it is required to stationarily locate the measuring object. Accordingly, the method can be used only under a particular environment from which shakes such as vibrations are excluded.

In contrast, a method of imaging optically-phase-shifted interference fringes at the same time using a plurality of imaging devices is known from JP-A 2-287107 and JP A 2000-329535. This document discloses a phase shifting method of synthesizing a reference light and an object light to provide a synthesized light, which is split into three through beam splitters. The three split lights are passed through three polarizing plates having different directions of polarization, and projected onto three imaging devices. This method can instantaneously take in a plurality of interference fringe images required for processing in the phase shifting method and accordingly achieve high-speed measurements as well as measurements under vibrating states.

An accurate measurement of the measuring object by the method disclosed in JP-A 2-287107 and JP-A 11-136831 is based on the premise that three phase-shifted interference fringe images have equal biases and amplitudes at corresponding points. The split intensity errors at the beam splitters and the installation errors associated with the fast axis and slow axis of the $\lambda/4$ plate occur, however, which make it difficult to equalize biases and amplitudes among three interference fringe images, resulting in a reduction in measurement accuracy.

If an error occurs on installation of the polarization axes of three polarizing plates, the amounts of phase shift between three interference fringe images become different from the design values. Therefore, the interference fringes caused at the surface of the measuring object cannot be given the same amount of phase shift as the design value matching the measurement principle, resulting in a reduction in measurement accuracy as well.

An improvement in measurement accuracy requires accurate production of optical parts contained in the interferometer and adjustment of the interferometer through the use of an accurate adjusting mechanism. A variation with time in interferometer enclosure, a variation in geometric size due to temperature fluctuations and the like, and a variation in performance of optical parts may vary bias values, amplitude values, and phases, which are given immediately after production of the interferometer. Therefore, it is preferable that the user can easily give these values, periodically or before measurement, in the environment in which the user uses the interferometer. This is effective to achieve measurements using an interferometer that is fast, accurate, and independent of use environments.

SUMMARY OF THE INVENTION

The present invention has an object to provide an interferometer including optical means operative to acquire phase-shifted interference fringes at the same time. The interferometer allows the user to easily measure variations in bias and amplitude of interference fringe intensities of interference fringes obtained from a plurality of imaging devices, and deviations of phases from the design values, periodically or before measurement, to achieve accurate measurements independent of use environments. A method of calibrating the interferometer is also provided.

To attain the above object, the present invention provides an interferometer, comprising: a wavelength-variable light source configured to emit a light with a variable wavelength; a light splitting/synthesizing member operative to split the emitted light into a measurement light and a reference light and synthesize the reference light reflected from a reference surface and the measurement light reflected from a measuring object; a light splitting means operative to split the synthesized light into a plurality of split lights, a plurality of phase shifting optical members operative to provide a certain phase difference between the split lights; an imaging unit operative to image a plurality of interference fringe images formed by the phase-shifted split lights; a wavelength controller operative to control the wavelength-variable light source to vary the wavelength of the emitted light to plural values; and an arithmetic unit operative to calculate biases, amplitudes and the amounts of phase shift of interference fringe intensities of the interference fringes formed by the split lights, based on interference fringe intensities of the imaged interference fringes, which are obtained by using part of the measuring object or by disposing a calibrating substrate instead of the measuring object, operating the wavelength controller to vary the wavelength of the emitted light to plural values, and operating the imaging unit to image a plurality of images of interference fringes obtained by the split lights.

To attain the above object, the present invention provides a method of calibrating an interferometer operative to split light emitted from a light source into a measurement light and a reference light and synthesize the reference light reflected from a reference surface and the light reflected from a measuring object, to split the synthesized light into a plurality of split lights, to provide a certain phase difference between the split lights to obtain a plurality of interference fringe images, which are analyzed to measure the shape of the measuring object, the method comprising: disposing a calibrating substrate instead of the measuring object: varying the wavelength of the emitted light to plural values: imaging a plurality of interference fringes obtained by the split lights based on variations in wavelength of the emitted light; and calculating biases, amplitudes and the amounts of phase shift of the plurality of split lights based on the acquired interference fringe intensities of the imaged interference fringes.

Thus, the present invention provides an interferometer that allows the user to easily measure variations in bias and amplitude of interference fringe intensities of a plurality of interference fringe images, and deviations of phases from the design values, periodically or before measurement, thereby achieving accurate measurements independent of use environments. It also provides a method of calibrating the interferometer.

DETAILED DESCRIPTION OF THE INVENTION

The present invention will now be described in embodiments in detail with reference to the drawings.

Figure 1:
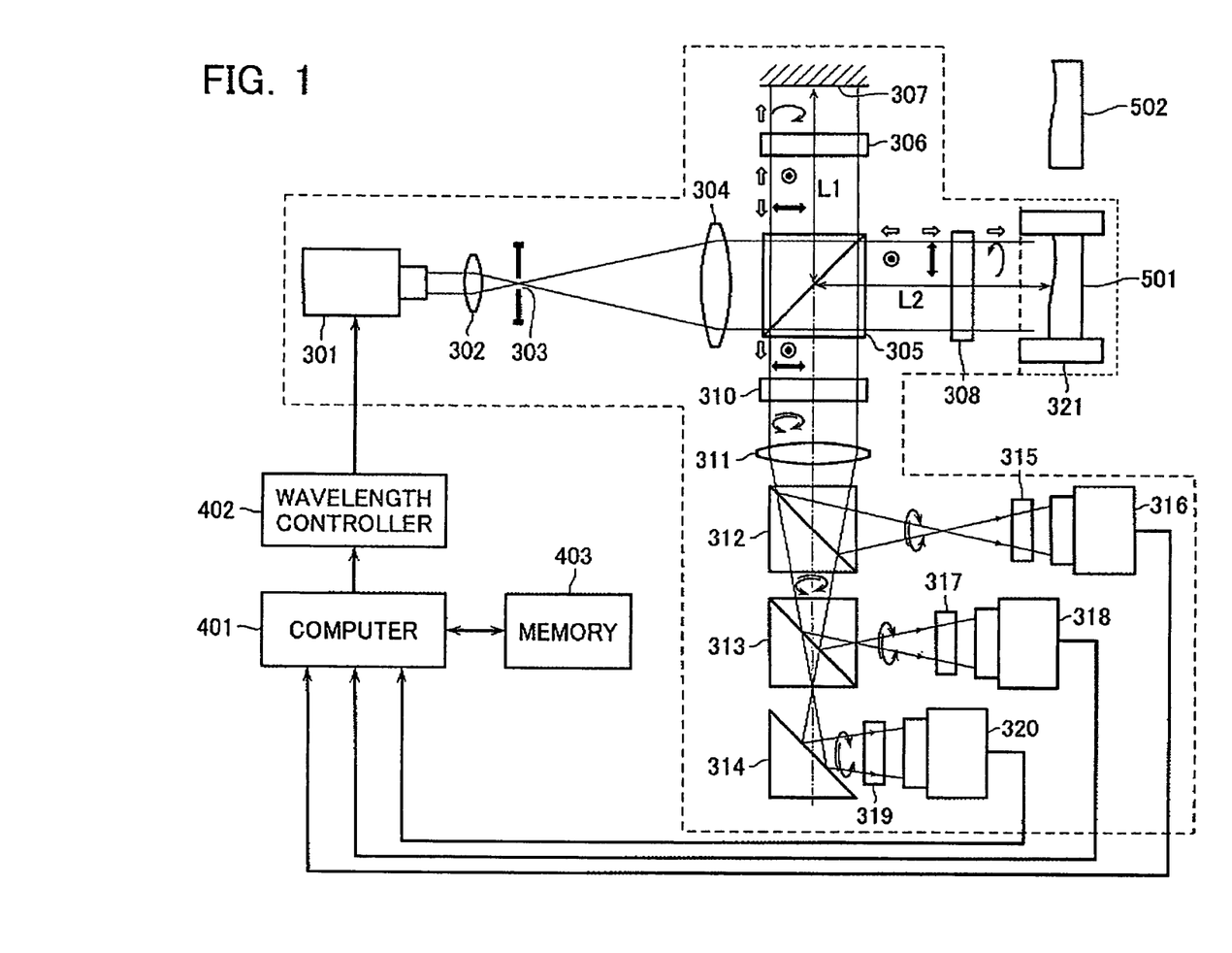
FIG. 1 shows a configuration of an interferometer according to a first embodiment of the present invention.

FIG. 1 shows an overall configuration of an interferometer according to a first embodiment of the present invention. The interferometer of the embodiment comprises a projector system, which includes a wavelength-variable laser 301, a condenser lens 302, a pinhole 303, and a collimator lens 304. The wavelength-variable laser 301 is configured to emit a light with a wavelength that is variable to plural values. The wavelength is controlled from a computer 401 through a wavelength controller 402. The computer 401 includes an installed software program for analyzing the captured interference fringe images and computing the shape of the measuring object. On execution of calibration of the interferometer, the computer 401 provides a control signal to control the wavelength of the light emitted from the wavelength-variable laser 301. The wavelength controller 402 controls the wavelength of the wavelength-variable laser 301 based on the control signal.

The light projected from the projector system is split through a polarizing beam splitter 305, or a light splitting/synthesizing member, into orthogonal, linearly polarized lights: a measurement light and a reference light. The measurement light and the reference light are converted from linearly polarized lights into circularly polarized lights through a ¼-wavelength plate 308 and a ¼-wavelength plate 306, and then reflected from a measuring object 501 and a reference surface 307, respectively. The reflected measurement and reference lights are converted through the ¼-wavelength plates 308, 306 into orthogonal, linearly polarized lights, which have a direction of vibration different by 90 degrees from that at the time of incident, and then synthesized through the polarizing beam splitter 305. The synthesized light is converted through a ¼-wavelength plate 310 into a synthesized light of a counterclockwise, circularly polarized light and a clockwise, circularly polarized light.

The interferometer also comprises an imaging lens 311, and a light splitting member, which includes beam splitters 312, 313 and a reflecting prism 314. The light splitting member splits light into three split lights, which are projected through the polarizing plates 315, 317, 319 onto CCD cameras 316, 318, 320, respectively.

The polarizing plates 315, 317, 319 have the directions of transmission axes different by 45 degrees from each other such that the three split lights passing through the polarizing plates have phases different by 90 degrees from each other. If the three split lights have equal biases and amplitudes at corresponding points, the following arithmetic procedure can be applied to measure the shape of the measuring object. This procedure derives a difference between image signals of interference fringe images formed by the three split lights, and obtains a cosine signal S and a sine signal C, and then calculates an arctangent of S/C, arctan (S/C). This makes it possible to specify the phase difference between the reference light and the measurement light, thereby measuring the shape of the measuring object. This measuring method is detailed also in JP-A 2-287107 and accordingly omitted from the following description.

A variety of errors already present in optical parts contained in the interferometer at the time of shipping as well as errors after shipping such as a variation over time may cause a difference in bias and amplitude between corresponding points on the interference fringe images. If there is a difference in bias and amplitude, bias components cannot be eliminated even if the difference between the image signals is computed, and amplitude components cannot be eliminated on computation of the arctangent. As for the amount of phase shift relatively given in between the interference fringe images, an accurate amount cannot be given as same as the design value because of the same reason. Accordingly, it is not possible for the above arithmetic procedure to specify the phase difference between the reference light and the measurement light.

In the interferometer of the embodiment, the following method is applied to measure biases, amplitudes and the amounts of phase shift of the interference fringe intensities of interference fringes captured at the CCD cameras 316, 318, 320 and execute calibration of the interferometer. First, instead of the measuring object 501, a calibrating substrate 502 is fixed to a tool 321. The calibrating substrate 502 is not required to have a known shape as long as biases, amplitudes and the amounts of phase shift of the interference fringe intensities are measured.

The calibrating substrate 502 with a known shape may be used in analyzing the interference fringes to compute the shape of the calibrating substrate 502, and computing a difference between the computed value and a true value of the shape of the calibrating substrate 502. In this case, a system error caused in the interferometer systematically can be grasped and, based on the grasped system error, it is possible to correct a measurement result of the measuring object 501.

The light emitted from the wavelength-variable laser 301 is led to the calibrating substrate 502 while varying the wavelength thereof to plural values, and the CCD cameras 316, 318, 320 are operated to image the interference fringe images at different wavelengths, respectively.

In general, the interference fringe obtained at one CCD camera 316, 318 or 320 has an interference fringe intensity $I_i$ (i=1, 2, 3: i=1 indicates the CCD camera 316, i=2 the CCD camera 318, and i=3 the CCD camera 320), which can be expressed by the following [Expression 1].

$$I_i(x, y, \lambda) = \qquad \text{[Expression 1]}$$
$$B_i(x, y) + A_i(x, y)\cos\left(\frac{2\pi}{\lambda} \cdot \Delta L(x, y) + \delta\phi_i(x, y)\right)$$

where $$\Delta L(x, y) = L_2(x, y) - L_1(x, y)$$

In the above expression, $B_i(x,y)$ indicates a bias. $A_i(x,y)$ indicates an amplitude, and (x,y) indicates coordinates at each corresponding point. $\Delta L(x,y)$ denotes a difference between an optical path length $L_1(x,y)$ of the reference light and an optical path length $L_2(x,y)$ of the measurement light, after split at the polarizing beam splitter 305 and until synthesized again. $\delta\Phi_i(x,y)$ denotes phases of the interference fringe intensities $I_1, I_2, I_3$, which are given different values as optical design values in increments of 90° at the polarizing plates 315, 317, 319.

When the wavelength $\lambda$ of the light emitted from the wavelength-variable laser 301 is varied by the amount of wavelength shift, $\Delta\lambda$, the interference fringe intensity $I_i$ is represented by the following [Expression 2].

$$I_i(x, y, \lambda + \Delta\lambda) = \qquad \text{[Expression 2]}$$
$$B_i(x, y) + A_i(x, y)\cos\left(\frac{2\pi}{\lambda + \Delta\lambda} \cdot \Delta L(x, y) + \delta\phi_i(x, y)\right) \approx$$
$$B_i(x, y) +$$
$$A_i(x, y)\cos\left[\left(\frac{2\pi}{\lambda} \cdot \Delta L(x, y) \cdot \left(1 - \frac{\Delta\lambda}{\lambda}\right)\right) + \delta\phi_i(x, y)\right]$$

This [Expression 2] can be modified as expressed below, [Expression 3]

$$I_i(x, y, \lambda + \Delta\lambda) \approx B_i(x, y) + A_i(x, y)\cos(F_i(x, y) + G\Delta\lambda) \qquad \text{[Expression 3]}$$
$$F_i(x, y) = \frac{2\pi}{\lambda} \cdot \Delta L(x, y) + \delta\phi_i(x, y),$$
$$G = -\frac{2\pi}{\lambda^2}$$

When the wavelength is shifted from $\lambda$ by the amount of wavelength shift, $\Delta\lambda$, the CCD cameras 316, 318, 320 capture different interference fringe images, which can be expressed as waveforms with a phase difference of $G\cdot\Delta\lambda(G=-2\pi/\lambda^2)$ as shown in [Expression 3].

The amount of wavelength shift, $\Delta\lambda$, may be varied in at least three ways. In this case, with respect to the amount of wavelength shift, $\Delta\lambda$, in the at least three different ways, one CCD camera 316, 318 or 320 images different interference fringes to acquire the interference fringe intensities thereof, thereby computing a bias $B_i(x,y)$, an amplitude $A_i(x,y)$, and a phase $F_i(x,y)$ From the computed phase $F_i(x,y)$, the amount of phase shift, $\delta\Phi_i(x,y)$, can be computed as well. The values of the bias $B_i(x,y)$ and so forth thus computed are stored in a memory 403 for use in measurement of the shape of the measuring object 501 for accurate computation of the shape as described later.

When N (N>=3) kinds of interference fringes are imaged by changing the wavelength, the amount of wavelength shift $\Delta\lambda$ can be arbitrary, unless the interference fringes are of the same phase.

For example, as shown in [Expression 4], N kinds of the amounts of wavelength shift, $\Delta\lambda_j$, can be set to values made by equally dividing one period ($2\pi$) into N (N≧3), respectively.

$$G \cdot \Delta\lambda_j = \frac{2\pi}{N} \cdot j \qquad \text{[Expression 4]}$$
$$j = 1, 2, \ldots N$$

Under this condition, computations can be executed in accordance with the following [Expression 5] to calculate the bias $B_i(x,y)$, the amplitude $A_i(x,y)$, and the phase $F_i(x,y)$.

$$B_i(x, y) = 1/N \cdot \sum_{j=1}^{N} I_{ij}(x, y) \qquad \text{Expression 5}$$

$$A_i(x, y) = 2/N \cdot$$
$$\left\{\left[\sum_{j=1}^{N} I_{ij}(x, y) \cdot \cos(G \cdot \Delta\lambda_j)\right]^2 + \left[\sum_{j=1}^{N} I_{ij}(x, y) \cdot \sin(G \cdot \Delta\lambda_j)\right]^2\right\}^{1/2}$$

$$F_i(x, y) = \tan^{-1}\left[\frac{-\sum_{j=1}^{N} I_{ij}(x, y) \cdot \sin(G \cdot \Delta\lambda_j)}{\sum_{j=1}^{N} I_{ij}(x, y) \cdot \cos(G \cdot \Delta\lambda_j)}\right]$$

From $F_i(x,y)$, the phase $\delta\phi_i(x,y)$ can also be calculated. In this embodiment, instead of calculation of $\delta\phi_i(x,y)$, the phase of the interference fringe intensity of the interference fringes imaged by the CCD camera 316 (i=1) is employed as a reference phase, and the amounts of relative phase shift $\alpha(x,y)$ and $\beta(x,y)$ regarding the reference phase are calculated by the following [Expression 6] and stored. On measurement of a relative shape of the measuring object with respect to the reference surface, calculations from the amounts of relative phase shift, $\alpha(x,y)$ and $\beta(x,y)$, can simplify calculations as obvious from the following description.

$$\alpha(x,y) = F_2(x,y) - F_1(x,y)$$
$$\beta(x,y) = F_3'(x,y) - F_1(x,y) \qquad \text{[Expression 6]}$$

The bias $B_i(x,y)$, the amplitude $A_i(x,y)$, and the amounts of phase shift $\alpha(x,y)$ and $\beta(x,y)$ thus obtained through measurement of the calibrating substrate 502 are used in correction to improve the accuracy of measurement of the measuring object 501. Such a method is described next.

Figure 2:
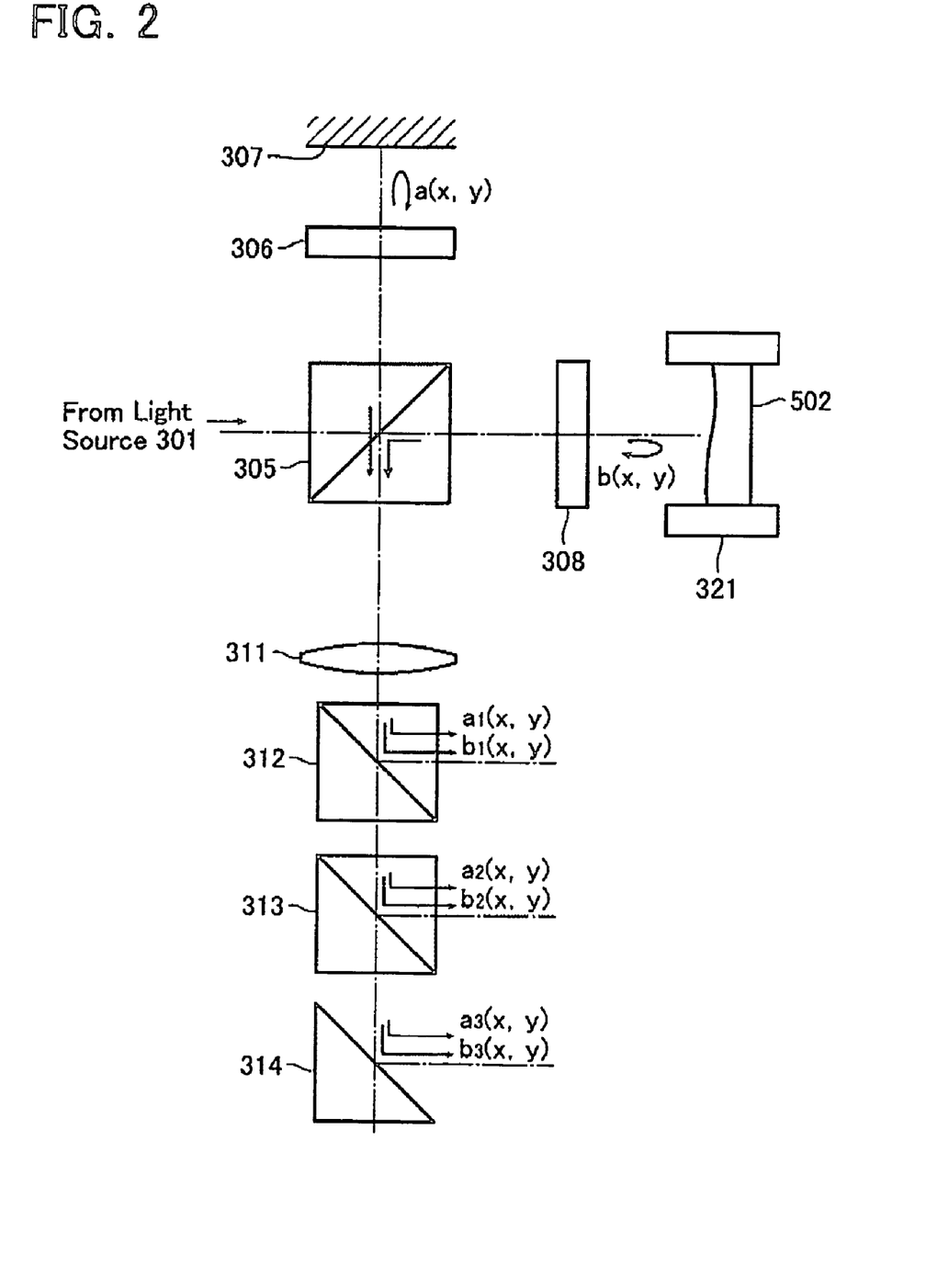
FIG. 2 defines the intensities of various lights resulted from measurement of a calibrating substrate 502 in the interferometer of FIG. 1.
Figure 3:
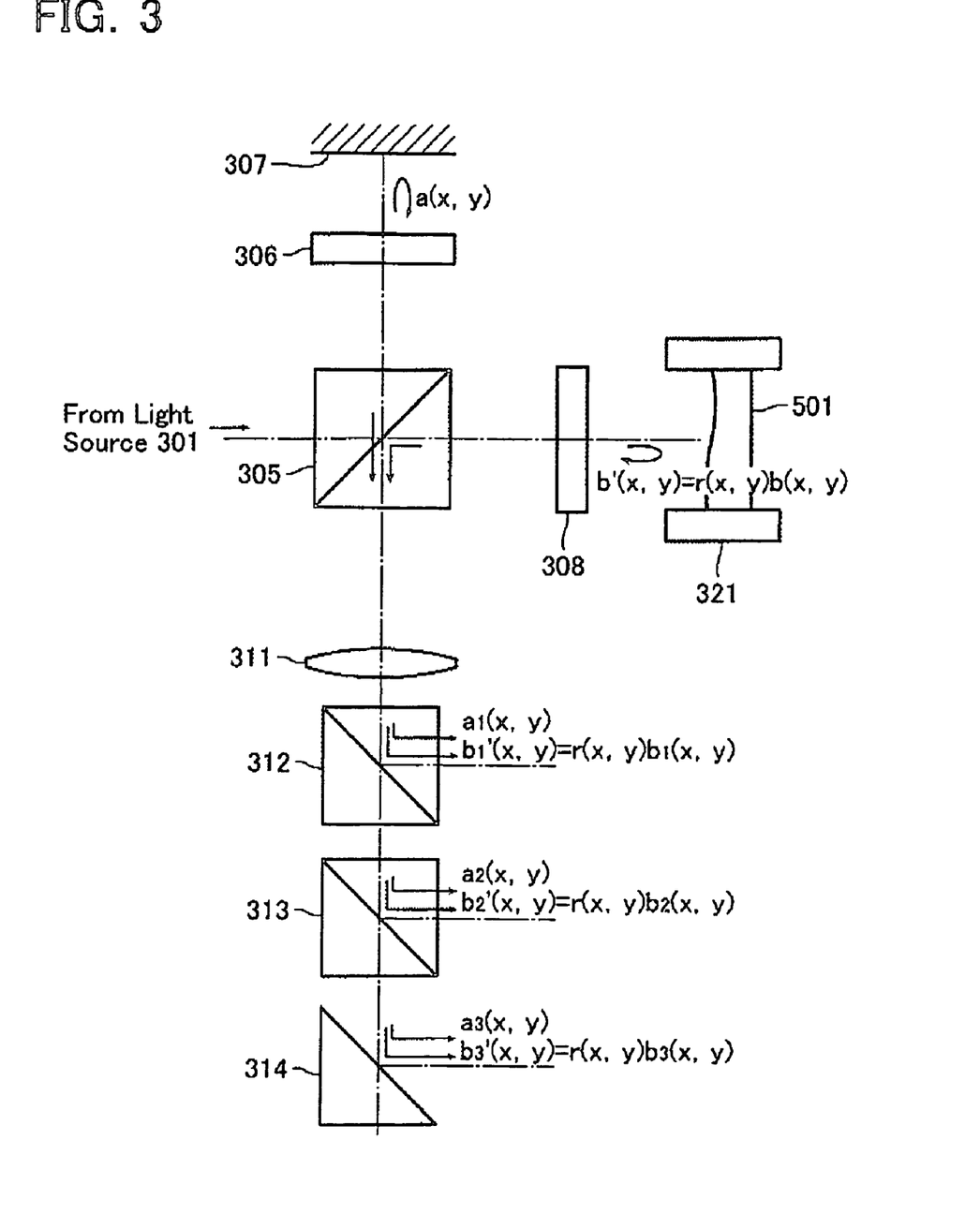
FIG. 3 defines the intensities of various lights resulted from measurement of a measuring object 501 in the interferometer of FIG. 1.

Intensities of various lights resulted from measurements of the measuring object 501 and the calibrating substrate 502 are defined as shown in FIGS. 2 and 3. The intensity of the reference light reflected from the reference surface 307 is defined as a(x,y), and the intensities of the reference light reflected from the beam splitter 312, the beam splitter 313 and the reflecting prism 314 as $a_1(x,y)$, $a_2(x,y)$, and $a_3(x,y)$, respectively. These are same in measurement of the measuring object 501 and as in measurement of the calibrating substrate 502.

In measurement of the calibrating substrate 502, the intensity of the measurement light reflected from the calibrating substrate 502 is defined as b(x,y), and the intensities of the measurement light reflected from the beam splitter 312, the beam splitter 313 and the reflecting prism 314 as $b_1(x,y)$, $b_2(x,y)$, and $b_3(x,y)$, respectively. There are relations among $a_i(x,y)$, $b_i(x,y)$ and the bias $B_i(x,y)$, the amplitude $A_i(x,y)$ as shown in the following [Expression 7].

$$B_i(x,y)=a_i(x,y)+b_i(x,y)$$

$$A_i(x,y)=2\sqrt{a_i(x,y)\cdot b_i(x,y)} \qquad \text{[Expression 7]}$$

The values of the bias $B_i(x,y)$ and the amplitude $A_i(x,y)$ have been obtained through measurement of the calibrating substrate 502. Accordingly, $a_i(x,y)$ and $b_i(x,y)$ can be specified from two equations in [Expression 7].

In measurement of the measuring object 501, the intensity of the measurement light reflected from the measuring object 501 is defined as $b'(x,y)$, and the intensities of the measurement light reflected from the beam splitter 312, the beam splitter 313 and the reflecting prism 314 as $b_1'(x,y)$, $b_2'(x,y)$, and $b_3'(x,y)$, respectively. An intensity ratio of the measurement light $b'(x,y)$ to the measurement light $b(x,y)$ is defined as a reflectance ratio $\gamma(x,y)$ as in the following [Expression 8].

$$b'(x,y)=r(x,y)b(x,y) \qquad \text{[Expression 8]}$$

As for the intensity of the split measurement light $b_1'(x,y)$, relations shown in the following [Expression 9] can be realized similarly.

$$b'_1(x,y)=r(x,y)b_1(x,y)$$

$$b'_2(x,y)=r(x,y)b_2(x,y)$$

$$b'_3(x,y)=r(x,y)b_3(x,y) \qquad \text{[Expression 9]}$$

In measurement of the measuring object 501, the bias $B_i'(x,y)$ and the amplitude $A_i'(x,y)$ can be represented, using the $b_1(x,y)$ and the reflectance ratio $\gamma(x,y)$, as the following [Expression 10].

$$B_i'(x,y)=a_i(x,y)+r(x,y)b_i(x,y)$$

$$A_i'(x,y)=2\sqrt{a_i(x,y)\cdot r(x,y)\cdot b_i(x,y)}=\sqrt{r(x,y)}\cdot A_i(x,y)$$

Therefore, in measurement of the measuring object 501, the intensity $I_i(x,y)$ of the interference fringe obtained at each CCD camera 316, 318, 320 is represented by the following $$I'_1(x,y) = a_1(x,y) + r(x,y)b_1(x,y) + \qquad \text{[Expression 11]}$$
$$\qquad 2\sqrt{a_1(x,y)\cdot r(x,y)\cdot b_1(x,y)}\cos[\phi(x,y)]$$

$$I'_2(x,y) = a_2(x,y) + r(x,y)b_2(x,y) +$$
$$\qquad 2\sqrt{a_2(x,y)\cdot r(x,y)\cdot b_2(x,y)}\cos[\phi(x,y)+\alpha(x,y)]$$

$$I'_3(x,y) = a_3(x,y) + r(x,y)b_3(x,y) +$$
$$\qquad 2\sqrt{a_3(x,y)\cdot r(x,y)\cdot b_3(x,y)}\cos[\phi(x,y)+\beta(x,y)].$$

$I_i'(x,y)$ is acquired from the image signals out of the CCD cameras 316, 318, 320 and $I_i'(x,y)$ is used to derive $\phi(x,y)$ algebraically as follows, for example.

First, the above [Expression 11] is modified into the following [Expression 12] having the left member of $I_i'(x,y)-a_i(x,y)$. Hereinbelow, expressions of the dimension $(x,y)$ are omitted.

$$I_1'-a_1=\gamma b_1+2A_1\sqrt{\gamma}\cos\phi$$

$$I_2'-a_2=rb_2-2A_2\sin\alpha\cdot\sqrt{\gamma}\cdot\sin\phi+2A_2\cos\alpha\cdot\sqrt{\gamma}\cos\phi$$

$$I_3'-a_3=rb_3-2A_3\sin\beta\cdot\sqrt{\gamma}\cdot\sin\phi+2A_3\cos\beta\cdot\sqrt{\gamma}\cos\phi \qquad \text{[Expression 12]}$$

With regard to $\gamma$, $\gamma^{1/2}\cdot\sin\phi$, $\gamma^{1/2}\cdot\cos\phi$, the [Expression 12] is solved.

$$\begin{bmatrix} \gamma \\ \sqrt{\gamma}\sin\phi \\ \sqrt{\gamma}\cos\phi \end{bmatrix} = \begin{bmatrix} b_1 & 0 & A \\ b_2 & -A_2\sin\alpha & A_2\cos\alpha \\ b_3 & -A_3\sin\beta & A_3\cos\beta \end{bmatrix}^{-1} \begin{bmatrix} I_1'-a_1 \\ I_2'-a_2 \\ I_3'-a_3 \end{bmatrix} \qquad \text{[Expression 13]}$$

If $\alpha$ are $\beta$ do not null the determinant shown in the following [Expression 14], the [Expression 13] can be solved for $\gamma$, $\gamma^{1/2}\cdot\sin\phi$, $\gamma^{1/2}\cdot\cos\phi$.

$$\det \begin{bmatrix} b_1 & 0 & A_1 \\ b_2 & -A_2\sin\alpha & A_2\cos\alpha \\ b_3 & -A_3\sin\beta & A_3\cos\beta \end{bmatrix}^{-1} \qquad \text{[Expression 14]}$$

Once $\gamma^{1/2}\cdot\sin\phi$, $\gamma^{1/2}\cdot\cos\phi$ are obtained, an arctangent of the ratio between both is taken as the following [Expression 15] to obtain $\phi$.

$$\phi = \tan^{-1}\left\{\frac{\sqrt{r}\sin\phi}{\sqrt{r}\cos\phi}\right\} = \tan^{-1} \qquad \text{[Expression 15]}$$

$$\left\{\frac{[b_2A_3\cos\beta - A_2\cos\alpha\cdot b_3]}{(I_1'-a_1)+[b_2A_3\cos\beta - A_1b_3]} \atop {(I_2'-a_2)+[b_1A_2\cos\alpha - A_1b_2](I_3'-a_3) \over [b_2A_3\sin\beta - A_2\sin\alpha\cdot b_3](I_1'-a_1) - b_1A_3\sin\beta -} \atop A_1b_3(I_2'-a_2)+b_1A_2\sin\alpha\cdot(I_3'-a_3)}\right\}$$

This [Expression 15] can be realized always identically regardless of the magnitude of the reflectance ratio $\gamma$. Accordingly, if $\gamma\neq 1$, that is, the calibrating substrate 502, used is different in reflectance from the measuring object 501, a measurement value can be calibrated with no influence therefrom. In addition, a measurement value can be calibrated without seeking the numeral value of $\gamma$. In this connection, the reflectance ratio $\gamma$ can be obtained from the following expression.

$$\gamma = \frac{A_2A_3[\sin\alpha\cos\beta - \cos\alpha\sin\beta](I_1'-a_1)+}{b_1A_2A_3\sin\alpha\cos\beta - b_1A_2A_3\cos\alpha\sin\beta +} \atop {A_1A_3\sin\beta(I_2'-a_2) - A_1A_2\sin\alpha(I_3'-a_3) \over b_2A_1A_1\sin\beta - b_1A_1A_2\sin\alpha} \qquad \text{[Expression 16]}$$

Figure 4:
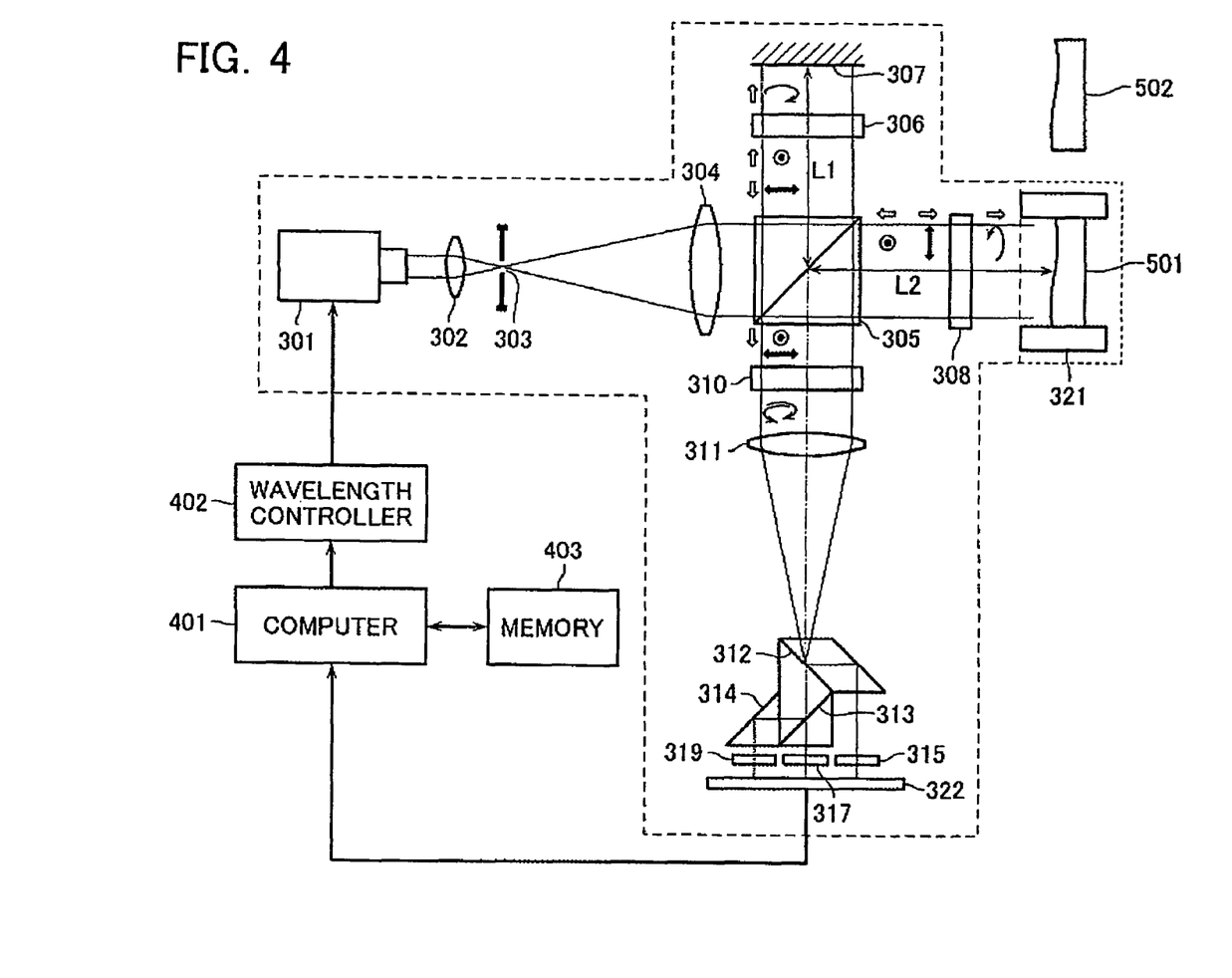
FIG. 4 shows a configuration of an interferometer according to a second embodiment of the present invention.

FIG. 4 shows an overall configuration of an interferometer according to a second embodiment of the present invention. The interferometer of this embodiment is configured such that a single CCD camera 322 captures the interference fringe images formed by the measurement and reference lights that are three-way split through the beam splitters 312, 313 and the reflecting prism 314.

Figure 5:
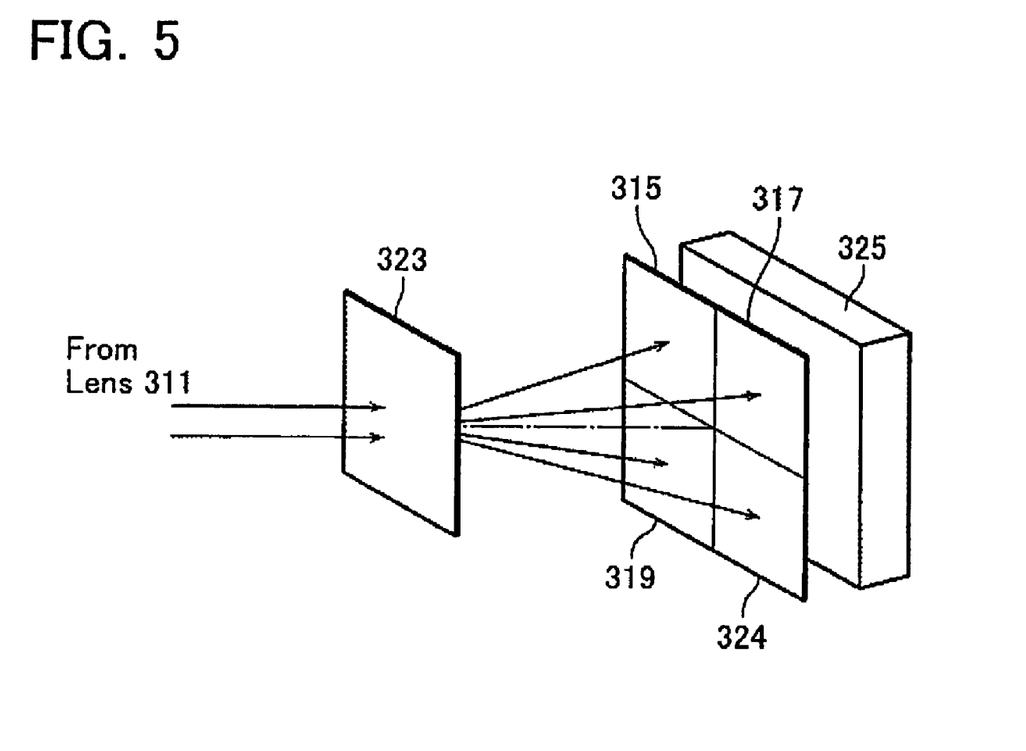
FIG. 5 shows a configuration of an interferometer according to a third embodiment of the present invention.

FIG. 5 shows only parts behind the lens 311 in a configuration of an interferometer according to a third embodiment of the present invention. The remaining parts are same as those in the preceding embodiments and accordingly omitted from the following detailed description. The interferometer of this embodiment is formed such that the measurement and reference lights are split through a grating 323, instead of the beam splitters 312, 313 and the reflecting prism 314, and given phase differences through the polarizing plates 315, 317, 319, 324. The imaging device may include a single CCD camera 325 as shown in FIG. 5 or CCD cameras provided corresponding to the split lights as shown in FIG. 1.

Figure 6:
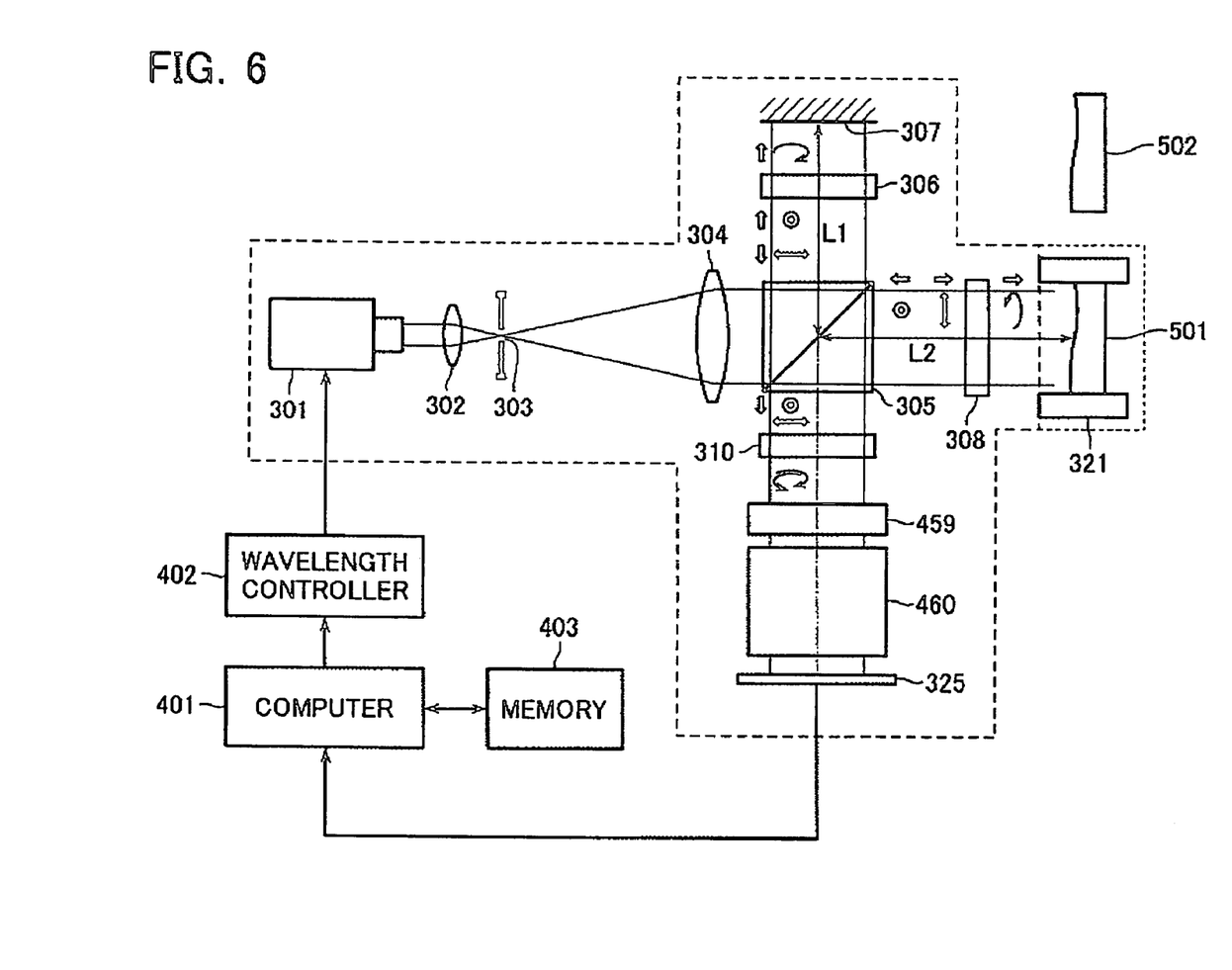
FIG. 6 shows a configuration of an interferometer according to a fourth embodiment of the present invention.

FIG. 6 shows an overall configuration of an interferometer according to a fourth embodiment of the present invention. The interferometer of this embodiment is formed such that a high-density phased-array device 460 is employed as shown in FIG. 6 to split the measurement and reference lights to plural ones and give phase differences to the split lights. The high-density phased-array device 460 is same as that disclosed in JP-A 2004-138617 filed by the applicant, of which configuration is briefly described below. The high-density phased-array device 460 comprises a multi-refractive substrate 462 such as a low-degree quartz wavelength plate. The multi-refractive substrate 462 has a surface 469 and a fast axis 468. A slow axis directs in a direction orthogonal to the fast axis 468.

Figure 7:
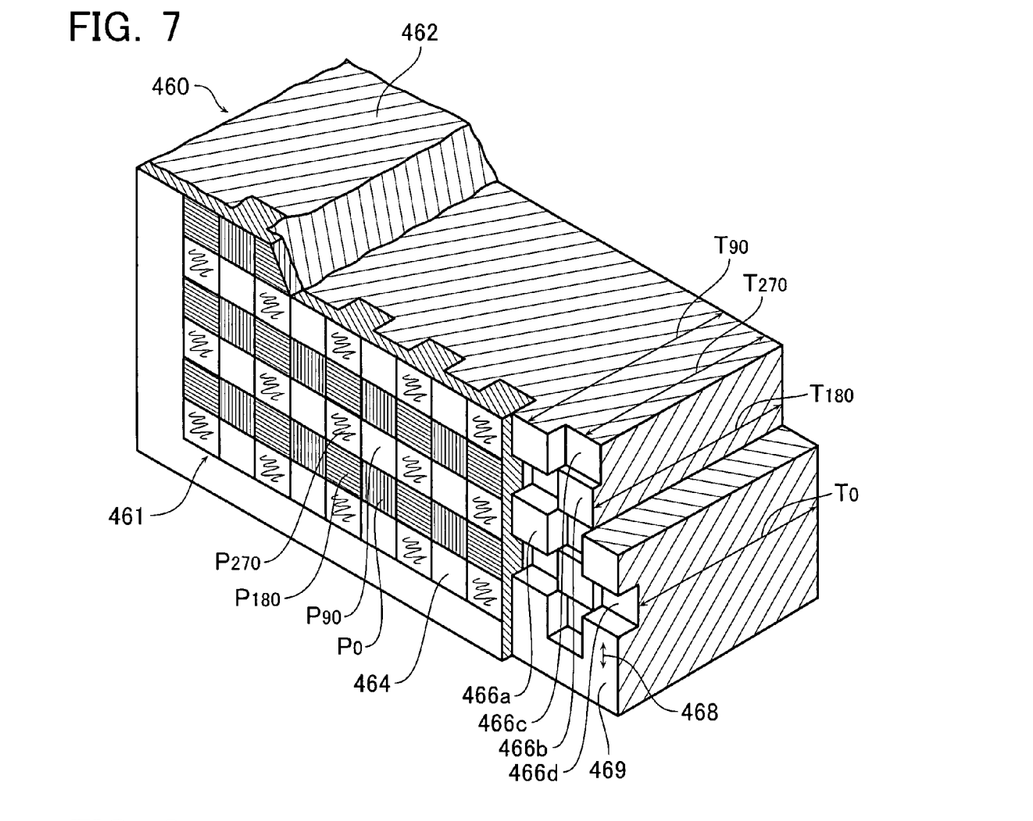
FIG. 7 shows a structure of a high-density phased-array device 460 of FIG. 6.

The multi-refractive substrate 462 includes a pattern 461 (portions 466a-d) formed in the shape of a rectangle per corresponding pixel group. The pattern has thicknesses formed different in four ways ($T_0$, $T_{90}$, $T_{180}$, $T_{270}$), thereby generating interference fringe images having four different relative phase displacements ($P_0$, $P_{90}$, $P_{180}$, $P_{270}$). The multi-refractive substrate 461 is covered in a plane layer 462 that gives no thickness-dependent phase.

Also in this structure, it is extremely difficult to produce and arrange optical parts with no error, and it is envisioned that variations in bias and amplitude among interference fringe images as well as deviations of the amount of phase shift from the design value may arise. Therefore, the calibrating method as above is also applicable to the fourth embodiment.

Next, with reference to FIG. 8, a fifth embodiment of the present invention will be explained. The above-described first to fourth embodiments are applicable when the measuring object 501 does not reflect light from its rear surface, or the it can be ignored (for example, the measuring object 501 is (1) a metal mirrored surface, (2) a wedge-shaped glass substrate having a front surface and a rear surface processed to be slanted to each other, (3) a glass substrate whose rear surface is processed to have a rough face, or the like). When the reflection from the rear surface cannot be ignored, the reflected light will be a noise light, making it difficult or impossible to accurately measure the bias, amplitude, the amount of phase shift and the like of the interference fringes.

In contrast, the interferometer and the calibration method of the fifth embodiment are configured such that the bias, amplitude and the like of the interference fringe signal can be measured even for a measuring object in which a reflected light (a noise light) from its rear surface cannot be ignored. This is different from the above-described embodiments.

Figure 8:
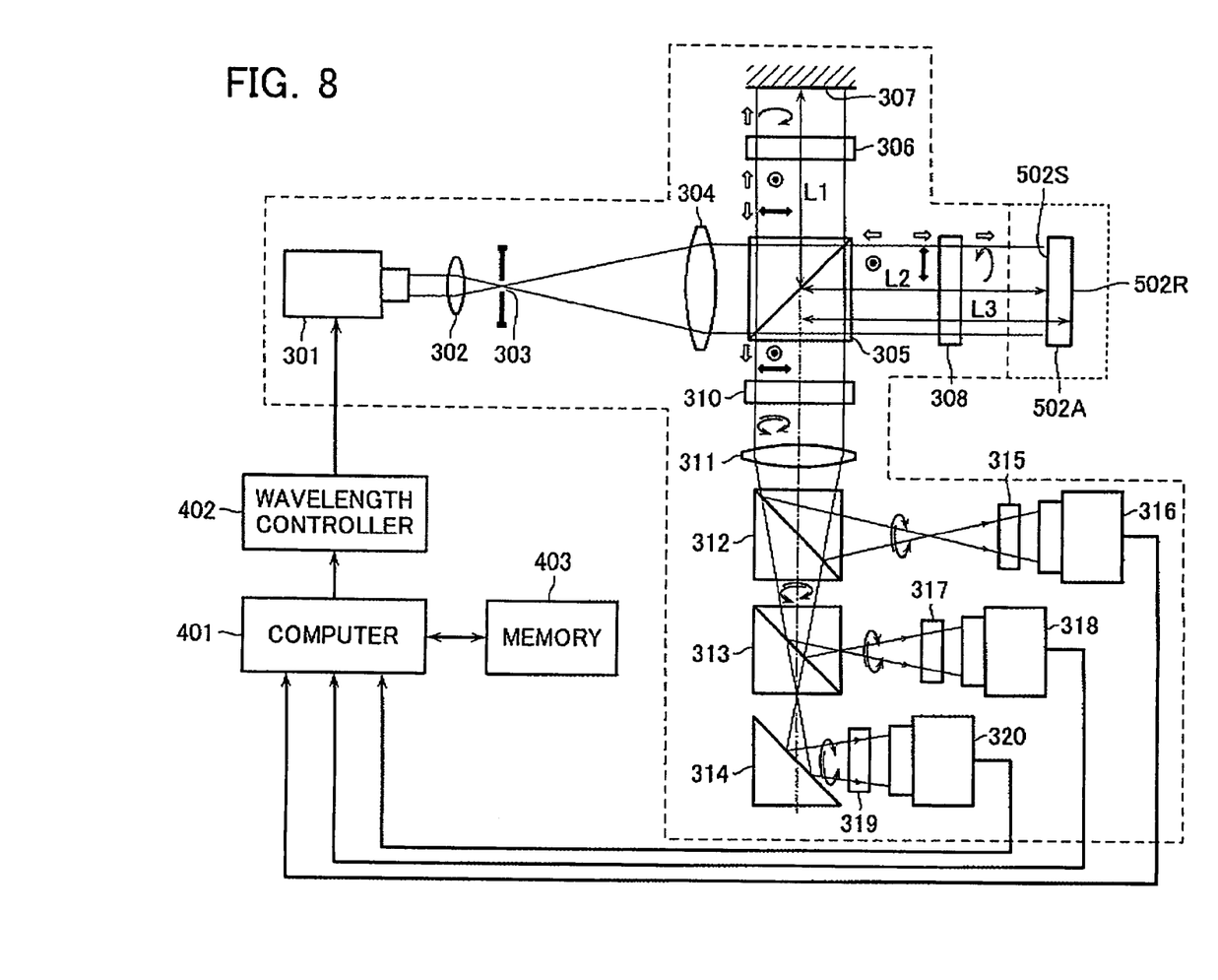
FIG. 8 shows a configuration of an interferometer according to a fifth embodiment of the present invention.

FIG. 8 illustrates an example of a configuration of the interferometer according to this embodiment. It is supposed here that a calibrating substrate 502A, which is a transparent substrate with a front surface and a rear surface parallel to each other, corresponding to a measuring object, is set in the interferometer.

Since a noise caused by a reflected light from the rear surface 502R of the calibrating substrate 502A is added to a reflected light from the front surface 502S, a noise light from the rear surface 502R cannot be ignored.

The interferometer shown in FIG. 8 is the same as the first embodiment (FIG. 1) as to the configuration of the optical system. It is also the same in that a wavelength of the light from the wavelength-variable laser 301 is changeable using a wavelength-variable controller 402.

Figure 9:
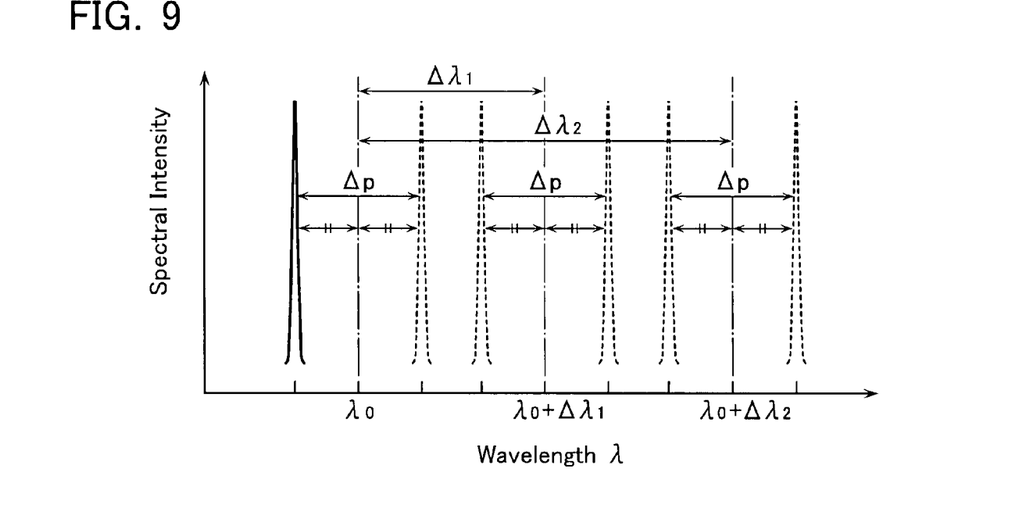
FIG. 9 is a graph illustrating a range of wavelength of light projected from the wavelength-variable laser 301 in the fifth embodiment.

In this embodiment, however, in order to reduce the influence by the noise light from the rear surface of the measuring object, not only the wavelength is varied to at least three values, but also each of the wavelength is given a certain wavelength width (wavelength scanning width). Hereinbelow, as shown in FIG. 9, explanation will be done, supposing that the wavelength controller 402 is configured so that a wavelength $\lambda$ of the projected light from the wavelength-variable laser 301 can be varied, setting at least three wavelength $\lambda_0$, $\lambda_0+\Delta\lambda_1$, $\lambda_0+\Delta\lambda_2$ as a center wavelength, in the range of plus or minus $\Delta p/2$ (wavelength scanning width $\Delta p$). But it is not necessary to vary the wavelength in equal widths with the center wavelength as a center. It is satisfactory if a wavelength is varied in a certain wavelength scanning width with a certain wavelength (a base wavelength) as a base. It is possible that the amounts of variation or scanning are different between the plus direction and the minus direction. Alternatively, it is also possible to vary the wavelength from the base wavelength to the plus side only, or minis side only.

Additionally, while varying the wavelength, the light is integrally received at each of the CCD camera 316, 318, and 320, respectively. In this specification, "integrally received" means that the light is received while the wavelength $\lambda$ is varied in a certain wavelength width within an exposure period Te of the CCD cameras. Thereby, a bias, an amplitude, an amount of phase-shift and the like may be measured without being influenced by the noise light from the rear surface 502R. The principle of this integral light receiving will be explained in detail hereinbelow.

When the noise light from the rear surface 502 cannot be ignored, interference fringe intensities $I_i'$ of the synthesized light generated by synthesizing the reference light, the measurement light, and the noise light, are obtained at the CCD cameras 316, 318 and 320. The intensities $I_i'$ can be expressed by the following expression. The expression is shown in a simple style, with the reference light, the measurement light, and the noise light expressed by complex amplitudes, and the amplitudes are made 1. In addition, though an interference fringe image has a two-dimensional light intensity distribution, the following expressions below simply shows a light intensity in a single point one-dimensionally.

$$I_i' = \text{Re}[\{\exp(ikL_1) + \exp(ikL_2) + \exp(ikL_3)\} \cdot \quad \text{[Expression 17]}$$
$$\{\exp(ikL_1) + \exp(ikL_2) + \exp(ikL_3)\}^*]$$
$$= \text{Re}[3 + 2\exp\{ik(L_2 - L_1)\} +$$
$$2\exp\{ik(L_3 - L_2)\} + 2\exp\{ik(L_3 - L_1)\}]$$

$L_1$, $L_2$, and $L_3$ denote an optical path length of the reference light, the measurement light, and the reflected light from the rear surface of the measuring object, respectively. K denotes a wave number ($=2\pi/\lambda$).

When the difference between $L_1$ and $L_2$, and the difference between $L_3$ and $L_1$ are defined as $\Delta L_{21}$ and $\Delta L_{31}$, respectively, [Expression 17] may be expressed as the following expression.

$I_i'=3+2\cos(k\Delta L_{21})+2\cos\{k(\Delta L_{31}-\Delta L_{21})\}+2\cos(k\Delta L_{31})=3+2\cos(k\Delta L_{21})+2\cos(k\Delta L_{31})+2\cos(k\Delta L_{21})\cos(k\Delta L_{31})+2\sin(k\Delta L_{21})\sin(k\Delta L_{31})$    [Expression 18]

When a wavelength is varied with the wavelength scanning width $\Delta p$ and the center wavelength $\lambda$ as a center wavelength during an exposure period Te of the a CCD camera, an integral interference fringe intensity $I_i$, which is an integral intensity of interference fringe images each generated by each wavelength, will be obtained. The integral interference fringe intensity $I_i$ is expressed by the following expression.

$$I_i = \int_{-\Delta p/2}^{\Delta p/2} I'_i \, dp \quad \text{[Expression 19]}$$

$$= \int_{-\Delta p/2}^{\Delta p/2} [3 + 2\cos(k\Delta L_{21}) + 2\cos(k\Delta L_{31}) +$$

$$2\cos(k\Delta L_{21})\cos(k\Delta L_{31}) + 2\sin(k\Delta L_{21})$$

$$\sin(k\Delta L_{31})] dp$$

Preferably, the wavelength scanning width $\Delta p$ is set in a range shown in the following expression.

$$\frac{\lambda^2}{\Delta L_{31}} < \Delta p < \frac{\lambda^2}{\Delta L_{21}} \quad \text{[Expression 20]}$$

The wavelength scanning width $\Delta p$ is related to a coherence length $\Delta l$. Setting the $\Delta p$ to meet the [Expression 20] makes the optical path length difference $\Delta L_{31}$ larger than the coherence length $\Delta l$, and optical path length difference $\Delta L_{21}$ smaller than the coherence length $\Delta l$. Thereby, influence of the noise light, that is, the reflected light from the rear surface 502R, is reduced or removed, while the reflected light from the front surface 502S (the measurement light) does not disappear and an interference fringe images can be obtained.

It is considered herein that the position of the measuring object 501 is adjusted so that the optical path length difference $\Delta L_{21}$ between the measurement light and the reference light is relatively smaller compared to that between the reference light and the reflected light from the rear surface 502R. In this case, out of the terms of the [Expression 19], terms that only contains $\Delta L_{21}$, such as the second term, are not varied greatly regardless of variation of the wavelength with the wavelength scanning width $\Delta p$, and thus intensities variable in accordance with the shape of the measuring object 501.

On the other hand, as for the term that only contains $\Delta L_{31}$, like the third term, the intensity is variable in accordance with wavelength scanning. But when it is integrated, it indicates averaged intensity, and thus intensity unrelated to $\Delta L_{31}$. Therefore, the third term is a term that indicates a bias in the interference intensity $I_i$. The first, constant term is a term that indicates a bias as well. The fourth and fifth terms each indicate intensity resulted from the intensity variable in accordance with the shape of the measuring object 501 multiplied by a bias component. Therefore, [Expression 19] can be represented as simplified as the following expression.

$$I_i \approx B_i + A_i \cos(k\Delta L_{21}) \quad \text{[Expression 21]}$$

$B_i$ denotes a bias, and $A_i$ denotes an amplitude. Accordingly, even when there exists a noise light reflected from the rear surface, the measurement can be performed while removing influence of the rear surface reflection, by performing a wavelength scanning with a center wavelength $\lambda$ as a center and in the wavelength scanning width $\Delta p$ to obtain an integrated interference fringe image.

When the center wavelength is varied greatly, the phase of the interference fringe, which are of constant value in a small optical path length difference $\Delta L_{21}$, can be also varied. Accordingly, the center wavelength $\lambda$ is varied by $\Delta\lambda$ larger than $\Delta p/2$, and then the light is integrally received within the range of $\Delta p$.

Measurements like this are performed using either of at least three or more center wavelength $\lambda_0$, $\lambda_0+\Delta_1$, $\lambda_0+\Delta_2$, respectively, and by imaging the interference fringe images.

Thereby, the biases, amplitudes and amounts of phase shift of the interference fringes can be measured while reducing influence of the noise light from the rear surface the measuring object 501. A method for measuring the bias, amplitude and amount of phase shift will be explained below in detail.

Integral interference fringe intensities $I_{ij}$ obtained by the CCD cameras 316, 318, 320 are expressed by the following expression, considering the difference of the amount of phase shift $\Delta\Phi_i$.

$$I_{ij} \approx B_i + A_i \cos\left(\frac{2\pi}{\lambda_j}\Delta L_{21} + \delta\phi_i\right) \quad \text{[Expression 22]}$$

When the wavelength $\lambda_j$ is varied from $\lambda_0$ by $\Delta\lambda_j$, and $\Delta\lambda_j$ is small enough compared to $\lambda_0$, the [Expression 22] can be approximated as the following expression.

$$I_{ij} \approx B_i + A_i \cos\left(\frac{2\pi}{\lambda_0 + \Delta\lambda_j}\Delta L_{21} + \delta\phi_i\right) \quad \text{[Expression 23]}$$

$$\approx B_i + A_i \cos\left(\frac{2\pi}{\lambda_0}\Delta L_{21} + \left(1 - \frac{\Delta\lambda_j}{\lambda_0}\right) + \delta\phi_i\right)$$

This expression can be further modified as follows.

$$I_{ij} \approx B_i A_i \cos(F_i + G\Delta\lambda_j) \quad \text{[Expression 24]}$$

where $$F_i = \frac{2\pi}{\lambda_0}\Delta L_{21} + \delta\phi_i$$

$$G = \frac{2\pi}{\lambda_0^2}\Delta L_{21}$$

Specifically, integral interference fringe intensity $I_{ij}$ obtained by one of the CCD cameras 316, 318, and 320 when the center wavelength $\lambda$ is shifted to $\lambda_0$, $\lambda_0+\Delta\lambda_1$, ... $\lambda_0+\Delta\lambda_j$, can be expressed as waveforms different in phases by $G\Delta\lambda_j$. Accordingly, the amount of phase shift $\Delta\lambda_j$ is varied at least to three values. Then, Imaging is performed using the three CCD cameras 316, 318, and 320, for each of these different amounts of phase shift at least in three ways. Therefore, similar to the above embodiments, a bias $B_i$, an amplitude $A_i$, an amount of phase shift $\delta\phi_i(x,y)$ and the like can be measured. Alternatively, amounts of phase shift can be calculated by [Expression 4] explained in the first embodiment, and a bias $B_i$, an amplitude $A_i$, an amount of phase shift $\delta\phi_i(x,y)$ and the like can be measured by [Expression 5].

As an example, when one of the center wavelength is set at $\lambda_0=1$ um and a glass substrate having a thickness of about 4 mm and a refractive index of about 1.5 is employed as an measuring object and a calibrating substrate, the interference noise can be erased by controlling the wavelength with $\Delta p=0.1$ nm. In this case, if the optical path length difference $\Delta L_{21}$ between the measurement light and the reference light is set at a small value, and the center wavelength $\lambda$ is shifted by $\Delta\lambda$ larger than $\Delta p/2$, the phase of the interference fringe can be shifted. This is easily performed in the commercially available wavelength variable laser.

In the above-described embodiment of calibration method for interferometer, examples in which a calibrating substrate is set instead of a measuring object have been shown. On measuring a plurality of measuring objects, instead of calibrating an interferometer by setting a calibrating substrate, one or some of the measuring objects are used for calibration of an interferometer.

Alternatively, when a shape of an object, which is larger than the measurement area of an interferometer, is scanned and measured, calibration is conducted using a part of regions In the measuring object. Using the obtained calibration values, the other area may be scanned and measured. In either case, a calibrating substrate does not have to be prepared. The other things are the same as the above-described embodiments.

The embodiments of the invention have been described above though the present invention is not limited to these embodiments but rather can be given various modifications, additions and so forth without departing from the scope of the invention.

What is claimed is:

1. An interferometer, comprising:
    a wavelength-variable light source configured to emit a light with a variable wavelength;
    a light splitting/synthesizing member operative to split the emitted light into a measurement light and a reference light and synthesize the reference light reflected from a reference surface and the measurement light reflected from a measuring object;
    a light splitting means operative to split the synthesized light into a plurality of split lights;
    a plurality of phase shifting optical members operative to provide a certain phase difference between the split lights;
    an imaging unit operative to image a plurality of interference fringe images formed by the phase-shifted split lights;
    a wavelength controller operative to control the wavelength-variable light source to vary the wavelength of the emitted light to a plurality of discrete values with a known wavelength difference between the discrete values; and
    an arithmetic unit operative to calculate biases, amplitudes and the phase shift of interference fringe intensities of the interference fringes formed by the plurality of split lights, based on interference fringe intensities of the imaged interference fringes, which are obtained by using part of the measuring object or by disposing a calibrating substrate instead of the measuring object, operating the wavelength controller to change the wavelength of the emitted light to a one of the plurality of discrete values for an exposure period of the imaging unit, during the exposure period varying the wavelength of the one of the plurality of discrete values over a wavelength scanning width defined by the discrete value and a wavelength shift therefrom, operating the imaging unit to image a plurality of images of interference fringes obtained by each of the plurality of split lights, the plurality of images of interference fringes obtained by each of the plurality of split lights being caused by the emitted lights with the plural discrete values, the biases, amplitudes and phase shift being calculated by solving simultaneous equations based on the interference fringes obtained by each of the plurality of split lights at the plurality of discrete wavelengths.

2. The interferometer according to claim 1, wherein the wavelength controller is operative to vary the wavelength of the emitted light to N values such that phases of the plurality of split lights are varied to values made by dividing one period ($2\pi$) into N (N$\geq$3), respectively.

3. The interferometer according to claim 2, wherein the arithmetic unit is operative at each of N wavelengths to acquire interference fringe intensities $I_{ij}$ (j=1 to N) of the interference fringes formed by the split lights and calculate the biases, amplitudes and phases based on data of the interference fringe intensities.

4. The interferometer according to claim 1, wherein the light splitting/synthesizing member comprises a polarizing beam splitter, with ¼-wavelength plates arranged in front of the reference surface and of the measuring object or the calibrating substrate.

5. The interferometer according to claim 1, wherein the arithmetic unit is operative to determine one or some of the phases of interference fringe intensities of the phase-shifted interference fringes as a reference phase, and calculate the relative phase shift with respect to the reference phase.

6. The interferometer according to claim 1, wherein the imaging unit comprises a single imaging member operative to image a plurality of interference fringes on receipt of the plurality of split lights.

7. The interferometer according to claim 1, wherein the light splitting means comprises a grating.

8. The interferometer according to claim 1, wherein
    said wavelength scanning width is determined to make an optical path length difference between a reflected light from a rear surface of the measuring object and the reference light larger than a coherence length, and optical path length difference between the measurement light and the reference light smaller than the coherence length.

9. The interferometer according to claim 1, wherein the phase shifting optical members comprise a single multi-refractive material divided into a plurality of portions, wherein the multi-refractive material is formed such that the multi-refractive material has different thickness per the plurality of portions.

10. A method of calibrating an interferometer operative to split light emitted from a light source into a measurement light and a reference light and synthesize the reference light reflected from a reference surface and the light reflected from a measuring object, to split the synthesized light into a plurality of split lights, to provide a certain phase difference among the split lights to obtain a plurality of interference fringe images, which are analyzed to measure the shape of the measuring object, the method comprising:
    disposing part of the measuring object or a calibrating substrate instead of the measuring object;
    changing a wavelength of the emitted light to a plurality of discrete values with, a known wavelength difference between the discrete values;
    imaging a plurality of interference fringes each obtained by the each of the plurality of split lights at each of the plurality of discrete wavelengths of the emitted light, while varying the wavelength of each of the discrete wavelengths over a scanning width defined by the discrete value and a wavelength shift, within an exposure period of the imaging; and
    calculating by solving a set of simultaneous equations based on the interference fringes obtained by each of the plurality of split lights at the plurality of discrete wavelengths biases, amplitudes and the phase shift of the interference fringes.

11. The method according to claim 10, wherein the step of calculating includes determining one or some of the phases of interference fringe intensities of the phase-shifted interference fringes as a reference phase, and calculating the amount of relative phase shift with respect to the reference phase.

12. The method according to claim 10, wherein the calibrating substrate has a known shape, the method further comprising:
  analyzing the interference fringes to compute the shape of the calibrating substrate and, based on a difference between the computed value and a true value of the shape of the calibrating substrate, gasping a system error caused in the interferometer systematically; and
  correcting based on the system error a measurement result of the measuring object.

13. The method according to claim 10 wherein said wavelength scanning width is determined to make an optical path length difference between a reflected light from a rear surface of the measuring object and the reference light larger than a coherence length, and optical path length difference between the measurement light and the reference light smaller than the coherence length.

* * * * *